Patented Jan. 19, 1943

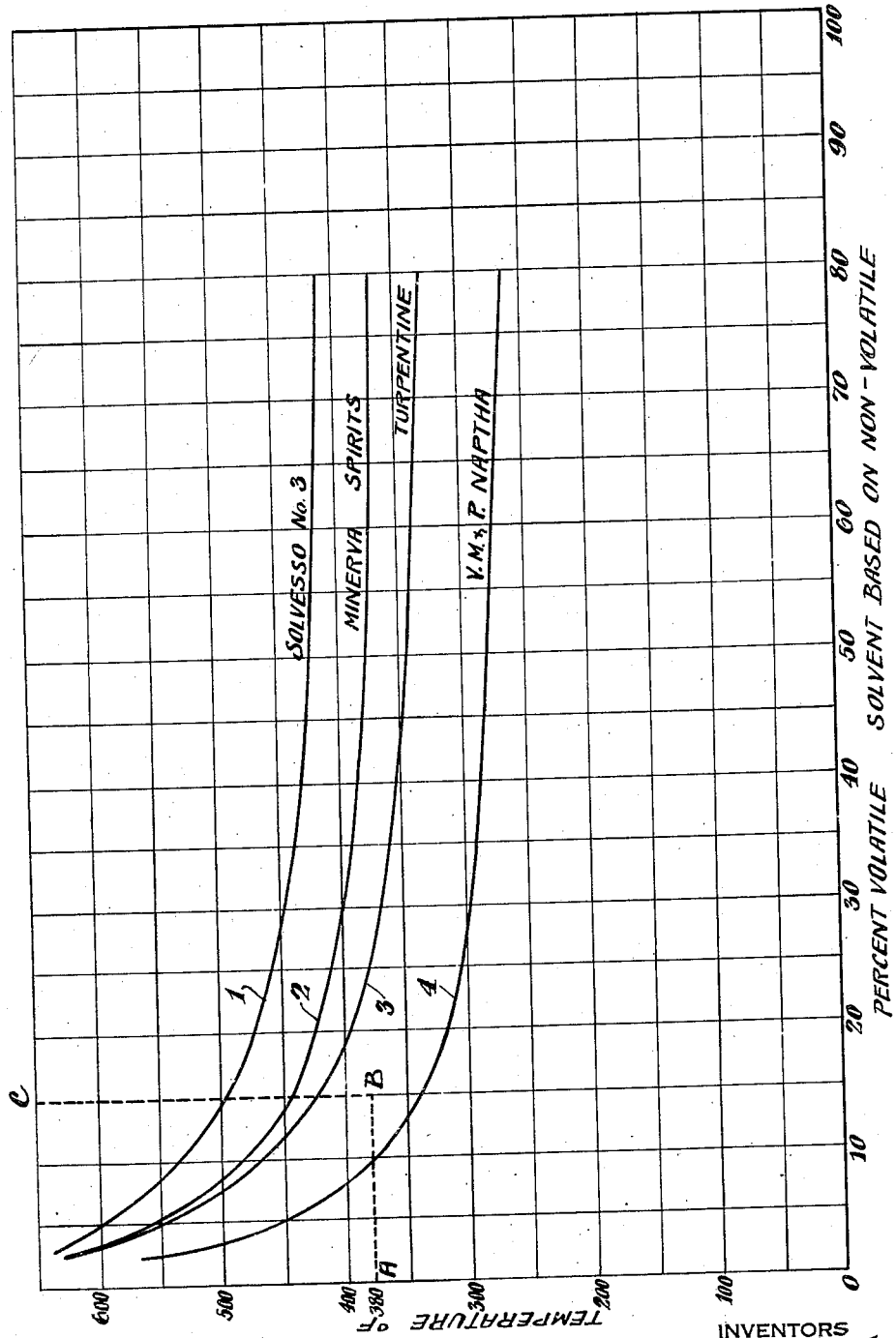

2,308,498

UNITED STATES PATENT OFFICE 2,308,498

PROCESS FOR FORMATION OF ESTER BODIES

Kenneth Allen Earhart and Benjamin Rabin, Louisville, Ky., assignors to Devoe & Raynolds Co., Inc., a corporation of New York Application April 28, 1939, Serial No. 270,522

6 Claims. (Cl. 260—18)

This invention relates to a process for the formation, in the presence of a volatile organic, non-reactive solvent of ester bodies suitable for use in coating compositions. These bodies usually involve the reactions of organic acids such as the fatty acids of drying oils with resins or polyhydric alcohols and their resulting compounds. By the phrase "formation of ester bodies" as used herein, we mean to include those bodies resulting from esterification, ester-interchange and polymerization reactions involving as reactants polyhydric alcohols, fatty acids and their esters, polybasic acids and anhydrides, natural resins, and their acids, and the numerous synthetic resins commercially available. Expressed in other words, our invention relates to a particular technique for forming composite ester bodies either of the drying oil-natural varnish resin type or of the drying oil modified alkyd resin type.

The reactions of the type employed for the production of such composite ester bodies involve heating the ingredients, and it has heretofore been suggested that such heating may be carried on in the presence of an inert solvent which is refluxed while the reaction is continuing. Such solvent treatments have usually been carried out with comparatively low boiling solvents, for the higher boiling solvents are not desirable in the finished compound and are expensive to remove. When low boiling solvents are used, somewhat improved results are obtained as compared to the usual open kettle cook, but the reactions are modified due to the low temperatures. Furthermore, long periods of time are necessary to obtain the desired reactions at the comparatively low temperatures necessitated by the low boiling solvents particularly if large percentages of these are present. If large amounts of high boiling solvents are employed, the treatment of the ester body solutions to remove the substantial amounts of high boiling solvents is difficult..

In accordance with our invention the practical difficulties heretofore experienced are overcome by employing highly concentrated solutions, i. e., using relatively very small amounts of solvents, which if left in do not interfere with proper drying of the ester bodies; and effecting by means of these markedly small amounts of solvent relatively very high temperatures of reaction which allow the usual esterification, ester-interchange and polymerization reactions to proceed at a rapid rate required for efficient and economical production of the desired homogeneous bodies.

We have discovered that if we employ less than 15% (and preferably less than 12%) of the solvent, we can employ a solvent which in and of itself has a low boiling point (so that ordinarily it can be left in the final composition), and at the same time we can heat the solution to a point far above the boiling point of the solvent before the active refluxing takes place. By this method, we have developed processes of producing coating compositions which give vastly improved results as compared with either the open kettle cook or the simple refluxing with low temperature solvents where it is customary to employ something over 30% of solvent and use relatively low temperatures.

When the high temperature-high concentration process of our invention is applied to the purely esterification type of reaction the effective removal of the substantial amount of water formed by the reaction is an important factor. This is done in the manner described more in detail below. Also when the process is utilized for formation of oleoresinous varnishes the removal of water is a desirable and advantageous practice but is not an essentiality in all cases. In the preparation of certain varnishes where relatively large volumes of water are evolved by chemical reactions, it is important to remove such water from the reaction. In the preparation of many oleoresinous varnishes, however, very small amounts of water are formed and do not demand their removal though such might be desirable for eliminating any slight influence the water might have as a hydrolyzing agent.

In carrying out our process, we employ a closed vessel or kettle, which should preferably be corrosion-resistant, equipped with a reflux condenser and the latter preferably provided with a well or trap that will collect any water which may be brought off with the solvent while permitting the solvent to return. We usually employ a solvent that is lighter than water but if a solvent heavier than water is employed, a suitable form of apparatus is used to separate water from solvent whenever necessary or desirable.

In the preferred system for carrying out our process the kettle (particularly where large volumes of water are evolved) should be supplied with a relatively large vapor outlet and condenser, because the capacity of the solvent for removing water depends primarily upon the speed with which it escapes from the kettle in the form of vapor rather than upon the amount of solvent present. The trap or well is usually filled with solvent in addition to the small amount included with the ester bodies under treatment in the kettle. However, if the amount of water evolved should be found from experience to displace more solvent from the well into the kettle than that which would allow the system to gain a certain desired high temperature, a corresponding amount of solvent could be omitted from the trap or well at the beginning of the reaction.

In view of the small percentages of solvent which we employ, the amount displaced from the trap may bear a substantial relationship to the total amount of solvent used. We have found that the increase in solvent by the displacement method (where water is a product of the reaction) is a valuable tool in balancing the physical forces at work.

Where an esterification reaction is taking place a substantial amount of water is evolved and, since water is insoluble in the solvent used, it causes the boiling point of the mixture to be affected by the laws pertaining to immiscible liquids, in accordance with which, each insoluble constituent contributes to the vapor pressure as if it were present alone. Since water boils at 212° F. (atmospheric pressure) it has a very high vapor pressure at the temperatures used and, since it is being evolved in large quantities during the early stages of reaction, little or no solvent is necessary to carry it to the condenser. However, as the reaction proceeds, less water is evolved and less water would find its way to the condenser if a solvent were not present. By using the displacement method we are able to add solvent to the system in direct proportion to the water evolved which means that additional solvent is automatically introduced as it is required to help carry over the remaining water.

In the reactions where substantial esterification takes place with evolution of water, we prefer to determine the percentage of solvent employed based on the final percentage after all of the water has been driven off and has displaced an equal volume of solvent from the well or trap. Even under these circumstances, we have found it desirable to keep the percentage of solvent below about 12% and definitely below 15%. In order to do this, we compute the amount of water that will be driven off during the reaction and initially include an amount of solvent so that it, plus the amount displaced from the well by the evolved water, will give the predetermined percentage which we wish to have present at the end of the reaction. For example, if we wish to carry out a certain process using 10% of a given solvent based on the theoretical yield and such solvent has a weight which is seven-eighths that of water, and we calculate that from 108 parts of ingredients, 8 parts of water will be evolved; that means that 7 parts by weight of solvent will be displaced from the well into the reaction vessel during the course of the operation, and therefore we would start with 3 parts of solvent to 108 parts of reactive ingredients and end with 10 parts of solvent to 100 parts of reacted ingredients.

We have found that this method of carrying out esterification type reactions is useful both in the formation of oil varnishes and also in the related type of reactions involved in the formation of synthetic esters, usually involving the reactions of dibasic acids, polyhydric alcohols, and the esters of fatty acids and polyhydric alcohols. For these types of reactions, we have found it advantageous to employ final processing temperatures ranging upward from about 380° F. to normal open kettle temperatures, e. g. 450° F. to 650° F., but using solvents having initial boiling points considerably below 400° F. and usually within a range of about 220° F. to 400° F.

We prefer to use a concentration of solvents and reactants such that the temperature which the mass reaches when it begins to boil actively is at least 60° F., and preferably at least 75° F. higher, than the temperature at which the solvent alone begins to boil actively.

In order to show the marked effect on boiling point effected by reducing the percentage of solvent, we have illustrated in the accompanying drawing the curves obtained for the boiling points of various solvents containing varying percentages of a material of the type which we might treat, which in this case was a 25-gallon varnish of the following composition: modified phenolic resin 510 parts, China-wood oil 400 parts, linseed oil 600 parts. The solvent was added to this varnish in varying proportions and the temperature at which there was a definite reflux in the condenser was determined for each proportion and on the basis of the data thus obtained, the curves were plotted.

In this drawing, the curve designated as No. 1 is for the mixture of Solvesso #3 and the varnish of the composition stated. (Solvesso #3 is known as a hydrogenated petroleum naphtha which boils actively at about 380° F. under atmospheric pressure.) The solvent employed in plotting curve #2 was mineral spirits of a cut which boiled actively at about 330° F. under atmospheric pressure. The solvent employed in determining curve #3 was turpentine, and the solvent for curve #4 was V. M. and P. naphtha. It should be noted that each of these curves shows a sharp increase in temperature as the amount of solvent is decreased below about 15% and especially below about 12%. The slope of the curve at lower percentages of solvent changes markedly as compared with the slopes represented by operations using relatively large amounts of solvents such as 30% or above, as shown by the remaining portion of these curves.

Since we ordinarily want to obtain a mixture which boils actively under atmospheric pressure at a final reaction temperature ranging up above 380° F., and do not wish to use over 15% of solvent, the maximum portion of these curves which we will employ and which indicates the above conditions is included in the portion cut off from the balance by the broken line ABC. Generally speaking the portion of the curve in which we are interested is that portion where each decrease of one part of solvent for each 100 parts of reactants will effect a boiling point rise for the mixture of at least 7° F.

Only a small number of solvents are indicated by the diagram, but our experience has shown that in the same way with many other solvents, the desired percentages fall within the portion of the diagram indicated. Examples of these other suitable solvents are xylol, mineral spirits, toluol, and hi-flash naphtha. Also, it is to be understood that the curves shown in the diagram are based on the above 25 gallon varnish and will vary with other types of varnishes or in general with different types of solids and solvent combinations. For example the alkyd resin mixtures react at somewhat lower temperatures than those shown on the diagram. The field of operation, in general, is characterized by reaction temperatures above 380° F. and the use of less than 15% solvent.

By utilizing our method of procedure marked improvements are obtained. In carrying out purely esterification reactions, such as involved in the formation of alkyd resins, it is particularly important to keep the reaction out of equilibrium by continuously removing all the water that may be evolved. The use of a refluxing solvent is particularly efficient for this purpose, and by combining the effect of the refluxing solvent with high temperatures, we get a good degree of esterification in a relatively short time so that marked economies result.

In the case of varnish manufacture, we are able to get temperatures substantially equal to those used in open kettle processes (425° F.–650° F.) as indicated by the accompanying graph. In preparing oleoresinous varnishes in accordance with the process of our invention, the principal advantages obtained by the presence of the solvent are as follows:

A. The solvent is a help in permitting us to heat wood oil to gas-proofing temperatures in big masses without producing gelation.

B. Solvent makes the heating or cooking process much more uniform. This is partly because the solvent vaporizing practically molecularly throughout the entire mass of varnish gives uniform motion and agitation of the mass internally down to molecular dimensions, which is substantially better than the ordinary mechanical stirrer. Because of this and the diluting effect there is less decomposition of oils and resins on the hot sides and bottom of the kettle.

C. Solvent maintains an atmosphere of its own vapor above the mass and thus prevents oxidation.

D. Solvent boiling out carries water and other decomposition products. If the decomposition products are more soluble in the solvent, they condense in the condenser, redissolve in the solvent, and come back in.

E. The presence of solvent controls the polymerization reaction somewhat and makes for a more uniform or homogeneous extent of polymerization of the molecules. There is not quite so much tendency for some to become larger than others as is the case without solvent. We obtain a product with less gelatin and therefore encounter less skinning troubles.

We also obtain final products which have an improved color and greater uniformity of polymer aggregates. As to the mechanics of the process, we find that by using our method the losses in yield are greatly reduced (particularly in the case of synthetic varnish bodies made by the reaction of various organic acids and glycerine) and an efficient control of the esterification reaction can be had by measuring the amount of water evolved.

Our invention can readily be understood by reference to the following examples:

EXAMPLE I

*50 gal. rosin varnish*

Parts by weight

Material:
W. G. rosin _____ 300
China-wood oil _____ 1176
Lime _____ 12
Litharge _____ 9
Mineral spirits _____ 1690

Procedure.—Heat the rosin, oil, lime, litharge, and about 50 parts of mineral spirits to 585° F. Hold for 15 minutes and, while still at 585° F., start adding the balance of the solvent; the temperature drops rapidly as solvent is added because in addition to any cooling we have on the kettle proper, the vaporizing solvent removes a large amount of heat and transfers it to the reflux condenser. The varnish cooked by this procedure dried splendidly, and had properties in practically every detail equal to or superior to the varnish made by cooking without solvent. It can be held at a temperature sufficiently high for gas proofing with less danger of gelation and with less decomposition than that cooked without solvent.

EXAMPLE II

*25 gal. modified phenolic varnish*

Parts by weight

Material:
Beckacite 1113 (phenol formaldehyde modified with ester gum) __pounds__ 570
W. G. rosin _____ 30
Litharge _____ 9
China-wood oil _____ 800
Bodied linseed oil _____ 378
Solvesso #3 (B. P. range 372° F.–412° F.) _____ 90
Turpentine _____ 173
Mineral spirits _____ 1387

Place the oils, resins, litharge and Solvesso #3 in kettle. Heat to 525° F. and hold for correct viscosity. Start cooling and adding the balance of the solvents at 525° F.

This varnish was gas proof, had good color, and dried equal to the regularly cooked varnish. The acid value was 11 compared to 17 for the regular varnish made without solvent.

Enamels containing zinc oxide were made up as follows:

Parts by weight

Material:
Zinc oxide _____ 6.8
Titanox B ($TiO_2$ 30% $BaSO_4$ 70%) ___ 26.2
Varnish (as above) _____ 55.62
Cobalt drier solution (1% cobalt by weight) _____ .38

In one case the varnish was that of Example II. In the second case the varnish was similar to this but made without solvent in an open kettle. The enamel containing the varnish made by our solvent process showed very slight bodying after 10 months storage. The enamel containing the varnish made in the open kettle bodied to a doughy mass during the same period.

The above two examples cover coating compositions commonly known as oleoresinous varnishes which deal in the main with processing at relatively high temperatures various natural and synthetic resins with drying and semi-drying triglycerides of 18 or more carbon atom fatty acids in the presence of a small quantity of a volatile solvent.

We have found moreover that the same principle of obtaining high reaction temperatures with small quantities of solvent applies also to the preparation of esters of the alkyd resin type where polyhydric alcohols are esterified with mixtures of dibasic and/or monobasic acids or mono and diglycerides are reacted with glycerol and dibasic acids or anhydrides e. g. phthalic anhydride. Heretofore esters of this type have been prepared in solvents at temperatures not much higher than the boiling points of the volatile solvents used, as contrasted with our process of carrying on an esterification reaction at a markedly high temperature, for example at a temperature of 150° F. above the boiling point of the solvent used. It is known that the reaction of glycerol and phthalic anhydride together with fatty acids of drying oils takes place with increasing speed in the temperature range of 360° F.–525° F. as practical limits. However, cooking in solvents heretofore was carried out by using large proportions of solvents which caused boiling at or near the bottom end of the range mentioned. Because of the use of relatively large proportions of volatile solvents the mixtures boil under atmospheric pressure at temperatures not much over that of the solvent alone. As a consequence the reaction is time consuming, the esterification is rather incomplete. The drying and baking time for the product is long if high boiling (400° F. initially or above) solvents are used to obtain high reaction temperatures.

When preparing the alkyd resins in accordance with our process, involving the use of solvents at temperatures much higher and with solvents with boiling points much lower than heretofore possible, the time of processing is greatly reduced and the esterification reactions will go more nearly to completion. Also by our use of concentrated solutions the disadvantages of slow drying or baking are eliminated due to the use of solvents which boil initially below 400° F. or in other words evaporate more rapidly.

EXAMPLE III

This is an example of a resin which cannot be prepared in dilute solutions unless high boiling point solvents are used due to the fact that the glycerol and phthalic anhydride are esterified to a point where the fatty acids cannot bring the reaction product into chemical solution except at temperatures considerably above 380° F. It can be prepared, however, in accordance with our invention in concentrated solutions even though low boiling solvents are used, as indicated by the following:

| Material: | Parts by weight |
|---|---|
| Hi-gravity glycerol | 23.89 |
| Phthalic anhydride | 35.18 |
| Linseed fatty acids | 48.80 |
| | 107.87 |
| Solvesso #3 (hydrogenated naphtha) | 10.00 |

The glycerol and phthalic anhydride were heated with 3.08 parts of Solvesso #3. The first esterification water was obtained at 376° F. and that temperature held until 2.9 parts of water was received in the well. By this reaction a glycerol-phthalate condensate was formed. The linseed fatty acids were added and a temperature of 380° F. regained when water of esterification was again obtained. The mass was milky due to the fact that the fatty acids are not a solvent for the glycerol-phthalate. The temperature was increased at a rate to reach 480° F. in 2 hours, and the reaction mass became homogeneous at approximately 410° F. and 4.08 parts of collected water. Upon reaching 480° F. the temperature was held for 2½ hours. The viscosity of the resin was 9 poises when reduced to 50% solids with mineral spirits. A total of 7.87 parts of water was received which displaced 6.92 parts of Solvesso #3 into the reaction mass. The acid number of the resin was 5.

It is significant to note that resins using fatty acids to modify preformed glycerol-phthalate as in Example III cannot be prepared by cooking in a solvent unless certain variables are kept within definite limits. From our experiments it would seem that the variables are a. Speed of temperature rise
 b. Dilution
 c. Boiling points of the solvents used and
 d. Solvent powers of the solvents used.

Since we have found that the speed of temperature rise at constant reflux rate is a function of or dependent upon dilution of the resin in solvents of various boiling points we might consider speed of temperature rise as an all inclusive factor. However, solvent power is an important factor, all other things being equal, and its bearing on the preparation of a practical resin should also be considered.

The chemical conditions which are present before and after the addition of the fatty acids must also be considered. In the case mentioned above we have chemically attached to the glycerol 56% of the phthalic anhydride in terms of water and this preliminary esterification reaction may be carried out above 330° F. but preferably between 370° F. and 390° F. as the most practical range from the standpoint of time required for the reaction and ease of control. The important point to remember is that the only acidic substance present is the phthalic anhydride which is reacting with the glycerol in the presence of a solvent while releasing water of reaction. As soon as fatty acids are added (the practical function of which is to modify the glycerol-phthalate and render it soluble through esterification accompanied by liberation of water) we immediately have another acid medium in competition with the remaining phthalic anhydride for the unreacted hydroxyl groups on the glycerol, and the reaction temperature should be raised appreciably, usually above 400° F.

While reference is made in the above Example III to the use of temperatures slightly below or near our stated minimum reaction temperature of 380° F. it will be understood that these temperatures relate to the preliminary esterification which takes place prior to the real reaction between the fatty acids and the resin. For effecting the latter final reaction the amount of solvent is maintained below 15% and the reaction temperatures are increased substantially above the preliminary esterification temperatures. Similarly, in other pure esterification reactions some measure of esterification will take place with some elimination of water at lower temperatures, e. g. at a temperature of about 360° F. or slightly lower. However, the esterification at these relatively low temperatures is very slow and the degree of esterification incomplete. For the final reaction and for rapid and more complete esterification the temperature is raised in accordance with our invention, as above mentioned.

EXAMPLE IV

We have also found that our process is adaptable to the use of fish oil fatty acids as a modifying agent of a partially formed glycerol phthalate.

| Material: | Parts by weight |
|---|---|
| Hi-gravity glycerol (99%) | 20.8 |
| Phthalic anhydride | 30.0 |
| Neo-fat #19 (fish oil fatty acids) | 56.4 |
| | 107.2 |
| Solvesso #3 (hydrogenated naphtha) | 10.0 |

The glycerol and phthalic anhydride were heated with 3.67 parts of Solvesso #3 to 360° F. where the first esterification water was received. The heating was continued, with a 10° F. temperature rise, until 2.24 parts of water were collected. The Neo-fat #19 was added and the mass heated to 370° F. where water of esterification was obtained again. The temperature was increased at a rate to reach 480° F. in 2 hours and then held for 2½ hours. The viscosity of the resin was 9.5 poises when dissolved 50% in mineral spirits. 6.33 parts of Solvesso #3 were displaced from the well by 7.2 parts of water and the acid number of the solid resin was found to be 6.5.

EXAMPLE V

In the following example we illustrate the technique of introducing "oil soluble" 100% phenolic resins. In this case the phenolic resin is 15% of the total solid product.

| Material: | Parts by weight |
|---|---|
| 98% C. P. glycerol | 25.10 |
| Phthalic anhydride | 39.98 |
| Linseed fatty acids | 43.05 |
| Para-Dura 10-P (an "oil soluble" phenolic resin) | 17.64 |
| | 125.77 |
| Solvesso #2 B. P. (275° F.–365° F.) | 4.24 |

The glycerol and phthalic anhydride were heated with some solvent from the well to 360° F. where the first water was received. Heating was continued at 380° F. until 3.24 parts of water were received. Then the linseed fatty acids and Para-Dura 10-P were added and the temperature brought back up to 380° F. where the second reaction began. The temperature was increased to gain 480° F. in 2 hours and held for and additional 3 hours. In order to gain 480° F. it was necessary to remove 2.66 parts of Solvesso #2 while 8.14 parts water of reaction was displacing 6.9 parts of Solvesso #2, i. e. there was 4.24 parts of Solvesso #2 present at the end of the reaction. The acid number of the resulting resin was 13.03 and the viscosity was 13 poises when dissolved 50% solids in a mixture of 20% Solvesso #2 and 80% V. M. and P. naphtha.

This resin has excellent properties as a retarder of "skin-drying" or preferential surface drying when blended with other alkyds for air drying or baking purposes. The retardation of "skin-drying" effects a more thorough through drying.

It is also interesting to note that the use of the solvent process gives much greater control over esterfication reactions since the speed or extent of the reaction can be measured in terms of water instead of working out a formulation by trial and by error in terms of time and temperature. For example, in the preparation of resins in the absence of solvent where the glycerol and phthalic anhydride are partially reacted before adding fatty acids and continuing esterfication, it has been common practice to process the glycerol and phthalic anhydride for a given time at a given temperature and then add the fatty acids because there is not time enough to run an acid number and, even if run, the results mean little due to the great insolubility of the product. Great variations from batch to batch were experienced.

In the case of resins cooked by the solvent process we are able to determine the extent of the reaction and the true acid number at any time by use of the following formula.

$$\text{Acid number} = \frac{(*\text{Theoretical water}-\text{water received})\ 3117}{\text{Yield at the moment}}$$

*Theo. water=Free water from glycerol plus equivalent water from acids or anhydrides assuming complete reaction.

In developing Example III it was found that if 56% of the theoretical water due to the phthalic anhydride's complete reaction with glycerol was exceeded by 4–6%, the acids were not able to modify the glycerol-phthalate to a homogeneous solution, and pieces of unmodified glycerol-phthalate gel settled out or clung to the sides of the reaction vessel. Not wishing to standardize the formula too close to such impractical limits, the phthalic anhydride was reacted with the glycerol to the extent of 56% of the theoretical in terms of water evolved before the addition of the linseed fatty acids. Using this proportion as a standard, batch after batch was prepared with little or no variation in the resulting resin.

Of course the amount of glycerol present with the phthalic anhydride, when 56% of the theoretical water is evolved, is very important. For example, if 5.39 parts of glycerol (the proportion chemically equivalent to the linseed fatty acids) were eliminated initially from the 23.66 parts used in Example III and 56% of the chemically equivalent water from the phthalic anhydride received by reaction as before and then the 5.39 parts of glycerol and the 48.80 parts of linseed fatty acids added and the reaction continued, insoluble gel particles of glycerol-phthalate would separate out before the linseed fatty acids could modify it.

The above example is cited to show that it is possible to learn in terms of equivalent water the limitations under the given conditions and proportions of reactants used and be guided accordingly to a workable formulation which, when once designed in terms of equivalent water, can be duplicated time after time.

In the case of preparing resins where the glycerol, phthalic anhydride and fatty acids are processed simultaneously with solvents and in the case where glycerol and drying oils are processed with or without catalyst to form mono-glycerides before reacting with phthalic anhydride in the presence of solvents it is not necessary to control the dilution, temperature rise and solvent power of the solvents so closely in order to assure homogeneous resins. However, we have still found it is necessary to minimize dilution in order to use low boiling solvents and yet obtain the high reaction temperatures described above as characterizing our process.

EXAMPLE VI

| Material: | Parts by weight |
|---|---|
| 98% C. P. glycerol | 21.39 |
| Phthalic anhydride | 28.08 |
| Maleic anhydride | 2.24 |
| Linseed fatty acid | 56.15 |
| | 107.86 |
| Solvesso #3 | 10.00 |

The glycerol, phthalic anhydride, maleic anhydride and linseed fatty acids were heated with 3.54 parts of Solvesso #3 to approximately 340° F. at which temperature first water was obtained. The temperature was then increased to 480° F. in approximately two hours and held for another hour or until a viscosity of 5.50 poises was obtained when the resin was thinned to 50% solids with mineral spirits. During processing 7.34 parts of water was collected in the well which in turn displaced 6.46 parts of Solvesso #3 into the reaction mass. The acid number of the resin was 11.

By the use of our process we were able to detect that castor oil is partially dehydrated when processed into an alkyd resin as follows:

Example VII

| Material: | Parts by weight |
|---|---|
| Castor oil | 45 |
| 98% C. P. glycerol | 10 |
| 98% C. P. glycerol | 12.00 |
| Phthalic anhydride | 38.10 |
| | 105.10 |
| Xylol | 2.40 |

The 45 parts of castor oil and 10 parts of 98% C. P. glycerol were heated to 520° F. and the temperature held for 1½ hours. .224 part of water collected in the well which is only 0.024 part more than we should receive from the 98% C. P. glycerol. Therefore dehydration does not occur during alcoholysis. The temperature was lowered to 440° F. and 12 parts of 98% C. P. glycerol and 38.1 parts of phthalic anhydride introduced with a small portion of xylol removed from the well. The mass was heated to 380° F. when first water of esterification was received and the temperature increased at a rate to reach 480° F. in two hours. The temperature was maintained at 480° F. for one hour more and then thinned to 50% solids with xylol. The viscosity of the solution was 6.27 poises. It was necessary to remove 2.75 parts of xylol from the well in order to gain 480° F. while 6 parts of water displaced 5.15 parts to give a net solvent content of 2.4 parts in the reaction mass. The acid number of the resin was 6.6.

When preparing numerous castor oil resins by the same procedure we have always obtained more water than theoretically calculated from the esterification reaction. In view of our accurate control of esterification, in terms of water, we have discovered that the excess water is due to a partial dehydration of the castor oil under the influence of phthalic anhydride as an acid catalyst. Calculated in terms of water, the castor oil of this particular resin has been dehydrated approximately 34%.

We are also able to make use of the valuable effects of phenolic resins as modifying agents by our solvent process.

Example VIII

| Material: | Parts by weight |
|---|---|
| Perilla oil | 23.5 |
| Tung oil | 23.5 |
| 98% C. P. glycerol | 10.87 |
| XR2963 Bakelite (rosin modified phenolic compound) | 23.5 |
| Phthalic anhydride | 21.44 |
| | 102.81 |
| Solvesso #2 | 6.00 |

The perilla oil and tung oil were heated at 440° F. in the presence of .0285 part of PbO for 1 hour. The XR2963 Bakelite and phthalic anhydride were added together with 3.8 parts of Solvesso #2 and brought to a temperature of 370° F. when first water was received. The temperature was increased to 430° F. in one hour and held 2½ hours longer. When thinned to 50% solids with mineral spirits the viscosity was 13 poises and the acid number of the solid resin was 15. During the reaction 2.6 parts of water was evolved which displaced 2.2 parts of Solvesso #2 from the well.

In like manner we are able to introduce maleic modified ester gums to modify and improve the drying of alkyd resins.

Example IX

| Material: | Parts by weight |
|---|---|
| Tung oil | 21.75 |
| Linseed oil | 21.75 |
| 98% C. P. glycerol | 9.04 |
| 801 amberol (maleic modified ester gum) | 32.00 |
| Phthalic anhydride | 17.80 |
| | 102.34 |
| Solvesso #2 | 6.00 |

The tung oil, linseed oil and 98% C. P. glycerol were heated to 440° F. with .025 part of PbO for 1 hour. The 801 Amberol and phthalic anhydride were added with 4.14 parts of Solvesso #2 and heated to 364° F. where first water was obtained. The temperature was gradually raised to 420° F. and held until a viscosity of 13 poises was obtained when thinned to 65% solids with Solvesso #2. The acid number was 15. 2.19 parts of water was evolved which displaced 1.86 parts of Solvesso #2 from the well. The acid number of the resin was 15.

Example X

| Material: | Parts by weight |
|---|---|
| Dehydrated castor oil | 55.0 |
| 98% C. P. glycerol | 16.60 |
| Phthalic anhydride | 32.71 |
| | 104.31 |
| Xylol | 3.63 |

The dehydrated castor oil and glycerol were heated to 440° F. in the presence of 0.018 part of PbO and held for one hour. The reaction mass was cooled to 400° F. and the phthalic anhydride added together with some xylol from the well. The temperature was raised to 375° F. where the first water of esterification was received. 480° F. was gained in 2 hours and held for 1½ hours longer. When dissolved 50% in mineral spirits the viscosity was 23 poises. During esterification 4.23 parts of water displaced 3.63 parts of xylol into the reaction mass. The acid number of the resin was 8.7.

An illustration of how ZnO can be used to speed up the alcoholysis of soy bean oil and glycerol followed by esterification in a small quantity of solvent to prepare useful non-yellowing alkyd resins is as follows:

Example XI

| Material: | Parts by weight |
|---|---|
| Soy bean oil | 58 |
| 98% C. P. glycerol | 13.73 |
| Phthalic anhydride | 32.49 |
| | 104.22 |
| Solvesso #3 | 10.00 |

The soybean oil and glycerol were heated to 515° F. in the presence of .029 part of ZnO and held for 1½ hours. After cooling to 420° F. the phthalic anhydride together with 6.76 parts of Solvesso #3 was introduced and the temperature raised to 380° F. where the first water of esterification was obtained. The temperature was raised to 480° F. in 2 hours and held for 2½ hours additional. When thinned to 70% solids with mineral spirits the viscosity was 15 poises. 3.68 parts of water displaced 3.24 parts of Solvesso #3 from the well during esterification. The acid number was 18.

It is understood that in the examples, the ingredients given are selected only by way of illustration and that the recognized equivalents may be substituted by those familiar with the art. Illustrative examples of such substitutions are as follows:

The oils or fatty acids mentioned in the above examples may be replaced wholly or in part by linseed, perilla, fish, soya, rapeseed, hempseed, China-wood, oiticica, cocoanut, safflower, castor, dehydrated castor, sunflower, and poyoak oils or the fatty acids thereof respectively.

The oil soluble resins may be replaced wholly or in part by natural resins, rosin, limed rosin, zinced rosin, ester gum, phenolic resins, oil modified phenolics, rosin modified phenolics, ester gum modified phenolics, maleic modified ester gum, coumarone-indene polymers, petroleum resins, and alkyd resins.

Compounds of lead, cobalt, manganese, iron, calcium, zinc, etc. may be introduced in the form of oxides, hydroxides, carbonates, acetates, resinates, naphthenates or other soaps.

Phthalic anhydride may be replaced in part or entirely with sebacic acid, adipic acid, or maleic "adducts" when glycerol is used entirely as the polyhydric alcohol.

Maleic "adducts" are products prepared by condensing maleic anhydride with compounds having conjugated double bonds according to the well known diene reaction.

Succinic anhydride or fumaric acid may replace phthalic anhydride if small amounts of ethylene glycol, diethylene glycol, triethylene glycol, or propylene glycol are present with glycerol.

Maleic anhydride may replace phthalic anhydride only partially unless it be reacted with the oils or fatty acid constituents before introducing a polyhydric alcohol.

Glycerol may be replaced in the whole or part with chemical equivalents of ethylene glycol, diethylene glycol, triethylene glycol, propylene glycol or other dihydric alcohols but this entails changes in properties of the resulting resin which are well known, e. g. loss of heat convertibility.

Pentaerythritol may be used as a replacement for glycerol but when used alone the constituents must be esterified with caution in order to avoid over-polymerization near the end of the esterification reaction.

Mannitol and sorbitol may be used as a replacement for glycerol but our experience indicates that these must be treated with care in order not to char and darken in color.

The phrase "drying oil-natural varnish resin composites" includes both those cases where a natural resin is directly incorporated with a drying oil and those cases where the natural resin is first compounded with other ingredients, as where ester gum or rosin modified phenolic resins are used.

Various other additional equivalents or modifications may be employed without departing from the spirit of our invention which, as previously stated, relates to the technique employed rather than to the actual reactions which take place.

We claim:

1. In the process of forming composite ester bodies selected from the group consisting of the drying oil-natural varnish resin composites and the drying oil modified alkyd resins, the step of heating the reactants to cause reaction to take place by boiling them at substantially atmospheric pressure in the presence of an organic solvent for such reactants which, alone, boils above about 220° F. and boils actively below about 400° F., which solvent is maintained present substantially throughout the cooking period in sufficient amount ranging between 2% and 15% based on the weight of the reactants to give a solution which at normal atmospheric pressure begins to boil actively at a temperature in excess of 380° F. and at least 60° F. above the temperature at which the solvent alone begins to boil actively.

2. A process as specified in claim 1, in which a combination is caused to take place between a polyhydric alcohol, drying oil fatty acids and the anhydride of a dicarboxylic resinifying acid, and which comprises the steps of condensing evolved solvent and water of reaction and returning evolved solvent separated from such water to the reaction mass.

3. A process for the manufacture of a varnish composition which comprises the steps of boiling at substantially atmospheric pressure varnish ingredients comprising a drying oil and a varnish resin comprising rosin, in the presence of an organic solvent for such reactants which, alone, boils above about 220° F. and boils actively below about 400° F., which solvent is maintained present substantially throughout the cooking period in sufficient amount ranging between 2% and 15% based on the weight of the reactants to give a solution which at normal atmospheric pressure begins to boil actively at a temperature in excess of 380° F. and at least 60° F. above the temperature at which the solvent alone begins to boil actively.

4. A process as specified in claim 3 in which the concentration of solvent is such that the solution begins to boil actively at a temperature at least 75° higher than the temperature at which the solvent alone begins to boil actively and such as to give a final processing temperature of between 425° F. and 650° F.

5. A process for the manufacture of alkyd resins which comprises the steps of boiling at substantially atmospheric pressure reactive ingredients comprising polyhydric alcohol, drying oil fatty acids and a dicarboxylic resinifying acid, together with an organic solvent for such ingredients which, alone, boils above about 220° F. and boils actively below about 400° F., which solvent is maintained present substantially throughout the cooking period in sufficient amount ranging between 2% and 15% based on the weight of the reactants to give a solution which, at normal atmospheric pressure, begins to boil actively at a temperature in excess of 380° F. and at least 60° F. above the temperature at which the solvent alone begins to boil actively, condensing the evolved solvent and water of reaction and returning evolved solvent to the reaction mass separated from the water.

6. A process as specified in claim 5 in which the amount of solvent is between 2% and 12% of the weight of the reactants.

KENNETH ALLEN EARHART.
BENJAMIN RABIN.